United States Patent [19]
Block et al.

[11] 3,730,029
[45] May 1, 1973

[54] PRECISION BORING MACHINE
[76] Inventors: Forest E. Block, 4892 Spring Brook Road, Rockford, Ill. 61111; Kenneth E. Peterson, 822 Hawthorne Avenue, Rockford, Ill. 61108
[22] Filed: Nov. 1, 1971
[21] Appl. No.: 194,312

[52] U.S. Cl. .................................................82/12
[51] Int. Cl. .............................................B23b 5/40
[58] Field of Search .......................82/12; 408/8, 31, 408/72, 236

[56] References Cited
UNITED STATES PATENTS
1,435,453  11/1922  Davis et al...............................82/12

Primary Examiner—Leonidas Vlachos
Attorney—J. Maguire

[57] ABSTRACT

A machine for use in precision boring of elongated workpieces.

4 Claims, 1 Drawing Figure

Patented May 1, 1973
3,730,029
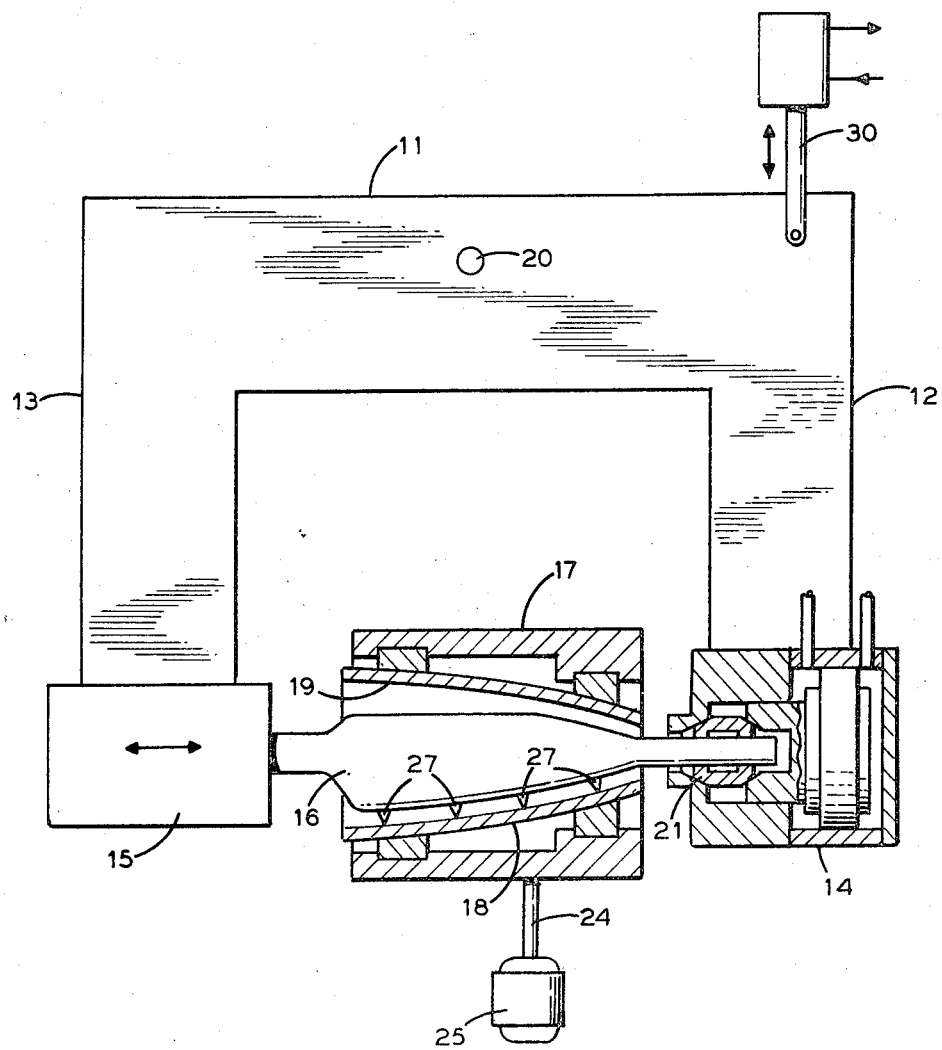
INVENTORS
Forest E. Block
Kenneth E. Peterson
BY
*J Maguire*
ATTORNEY

PRECISION BORING MACHINE

This invention relates to an apparatus for use in generating an interior surface of precise revolution around the longitudinal axis of a workpiece having a bore.

More particularly, this invention relates to an apparatus for use in generating an interior surface of a curve which is a circular arc of radius R within the aforesaid bore of a workpiece.

In general, it is assumed that a workpiece to be finished with an interior of desired configuration having precise dimensions is initially formed with a rough type bore by casting, forging and the like.

In the past, a precision finish could be imparted to the bore of a workpiece usually by means of a contour lathe. In the latter device, the workpiece is usually rotated relative to the lathe and the cutting means is supported at one end but is movable in a controlled manner in at least two mutually perpendicular rectilinear directions. The difficulty with the conventional device of this nature is that the desired configuration of the cavity usually imposes restrictions on the size and shape of the holder and cutting means affixed thereto.

For instance, the holder of the cutting means is generally a relatively long and narrow member which experiences a tremendous amount of strain due to the loading as the act of cutting is carried on at the extremity of the holder. In the past, for convenience, the holder was only supported at one end. As such, the load which the cutting device could sustain with limited by the tendency of the holder to vibrate and deflect from its intended position. Such vibrations or, as known in the trade, "chatter" cause discontinuities in the surface being machined. Further deflection also causes the cutting means to occupy an undesired location and, as a result, would produce an inaccurate surface configuration.

The above deficiencies of the art are more pronounced as the ratio of the length to the diameter of the holder is increased. Experience in the field has shown that there are optimum ratios of the aforesaid factors which must not be exceeded to produce an acceptable product. Attempts have been made to mitigate this problem, through the use of stiffer material or a reduction of the cutting load. However, this can only be done by reducing the load on the cutting device or by reducing the feed rate of the tool. As a result, the latter action requires making a plurality of cutting passes to remove the required amount of metal to assure precision. All of the above, influences the production rate of the finished product by increasing the interval of time necessary to finish one workpiece.

What is needed in the art is an apparatus for use in producing a desired configuration or finish of precise dimension within the initially rough type interior of a workpiece, the interior being in the form of a longitudinal passage of open end construction.

The subject invention answers the aforesaid needs of the art without encountering the difficulties of the conventional methods and apparatus with special emphasis on a simple apparatus of novel construction for use in the optimization of the production of workpieces having the desired internal configuration of precise and reproducible dimension.

It is therefore an object of this invention to provide an apparatus for use in generating an interior configurations of precise dimensions within the rough bore of a workpiece.

A further object is to provide an apparatus for use in the generating of an interior surface of revolution around the longitudinal axis of a rough cavity or bore of a workpiece.

Another object is to provide an apparatus for use in generating a curve of the aforesaid interior surface in the form of a circular arc of variable radius as desired along the longitudinal axis of such workpiece.

Other objects and many attendant advantages of this invention will become more apparent to one skilled in the art upon a reading of the following detailed descriptions taken with the accompanying drawings, wherein:

The figure is a schematic view of the apparatus of this invention.

In the broad sense, the apparatus of this invention is provided with a pivotal base in the horizontal plane having dual arms 12 and 13 extending from such base 11 in same plane, each of which has attached thereto a separate means 14 and 15 for supporting a cutting tool 16. Intermediate said first 14 and second 15 support means is a third supporting means 17 for use in the axial rotation of a workpiece having a rough bore or cavity 19 through which such cutting means 16 passes.

In this invention, the choice of the cutting means 16 and the attitude of such means to the axially revolving workpiece 18 would determine the configuration, shape and precision of the finished cavity or bore of the final product.

In the narrow sense of the concept, the apparatus would comprise a base 11 in the form of a flat plate of the U-shape variety having a first 14 and second 15 supporting means in aligned relation to one another and pivotally movable with the arms 12 and 13 of such plate 11 to which they are affixed. Intermediate the arms of the base and in operative alignment with the aforesaid supporting means is a third stationary supporting means 17 adapted to provide axial rotation to said workpiece 18. The first 14 and second 15 supporting means are adapted for longitudinal movement to provide separable engagement of the cutting tool by the first and second supporting means and access of the cutting tool through the bore of the workpiece in the third supporting means.

In the preferred embodiment, as shown, the base 11 is provided with pivotal point 20. The second supporting means 15 of the apparatus is in the form of a tool supporting head and the latter is adapted for longitudinal movement transverse the arms 13 of the base 11. The head support 15 is driven in either longitudinal direction relative to the arm 15 by conventional means such as a cylinder and piston type fluid actuator. Power for driving such actuator could be preferably supplied by a conventional oil hydraulic power unit which could include valve means for controlling the directions and speed of an actuator motion.

The supporting means 14 has a receptive open end 21 for receipt of the end of the elongated cutting tool 16 when inserted therein. The latter supporting means 14 is provided with a conventional hydraulic system which is initiated into providing gripping engagement against such tool end by the lateral movement of the tool in to the opening of the supporting means 14. This lateral movement is initiated and provided by the longitudinal movement of supporting means 15 towards the workpiece.

The above presupposes that the cutting tool 16 has passed through the rough bore or cavity of the workpiece 18 and is now secured on either end by supporting means 14 and 15.

In operation the workpiece 18 is secured in position by supporting means 17 and the cutting tool 16 is passed through the cavity or bore 19 by the lateral movement of second supporting means 15. After passage of the tool through the bore 19 it is secured in position as heretofore indicated.

At this point, the workpiece 18 may be revolved around its longitudinal axis by the supporting means 17 through linkage 24 which communicates with a source of motive force 25. Contact of the cutting tool 16 with the interior surface of the workpiece to produce the precise configuration desired is accomplished by cutting surfaces 27 which respond to the pivotal action of the base 11 and the movement of the extended arms 12 and 13.

Very exact and precise surfaces of a cavity may be produced by this apparatus. Thus as the workpiece revolve, the cutting tool is moved in an arcuate manner relative to such bore a cavity in response to the pivotal movement of the base around pivot 20. To regulate the pivotal movement of the base in order to achieve the optimum in duplicate configuration of precise dimension a regulator 30 is provided which may be in the form of a hydraulic cylinder and piston.

In the manner described, the device of this invention has been found to produce interior surface of very precise revolution around the longitudinal axis of a workpiece having a bore. It has been found that this may be accomplished in an effective and efficient manner for the optimization of the production of such precise workpieces in a minimum of time without encountering the deficiencies or difficulties of the art.

What is claimed is:

1. An apparatus for producing an interior surface of revolution around the longitudinal axis of a bore or a workpiece comprising A base pivotally mounted in a plane
  said base having dual arms in the same plane,
A first supporting means mounted on one of said arms,
A second supporting means mounted in fixed relation to the other of said arms,
A third supporting means for said workpiece mounted in fixed relation between said first and second supporting means,
  said latter means adapted to provide axial rotation to said workpiece, and
An elongated cutting tool passing through said workpiece and supported by both said supporting means.

2. The apparatus of claim 1 wherein said first supporting means is movable transverse said arm along a longitudinal axial path relative to said workpiece.

3. The apparatus of claim 1 wherein said second supporting means is separably engaged to said cutting tool.

4. The apparatus of claim 1 wherein the pivotal movement of said base is regulated to a circular arc of a predetermined radius.

* * * * *